Nov. 18, 1958 W. R. DRESSER 2,860,541

WIRELESS CONTROL FOR RECORDING SOUND FOR STEREOPHONIC REPRODUCTION

Filed April 27, 1954

INVENTOR.

BY Willis Robert Dresser

Emery, Varney, Whittemore & Dix.

ATTORNEYS 2,860,541
Patented Nov. 18, 1958

2,860,541

WIRELESS CONTROL FOR RECORDING SOUND FOR STEREOPHONIC REPRODUCTION

Willis Robert Dresser, Long Hill, Conn., assignor to The Vitarama Corporation, Huntington, N. Y., a corporation of New York Application April 27, 1954, Serial No. 425,856

11 Claims. (Cl. 88—16.2)

Figures 1, 2:
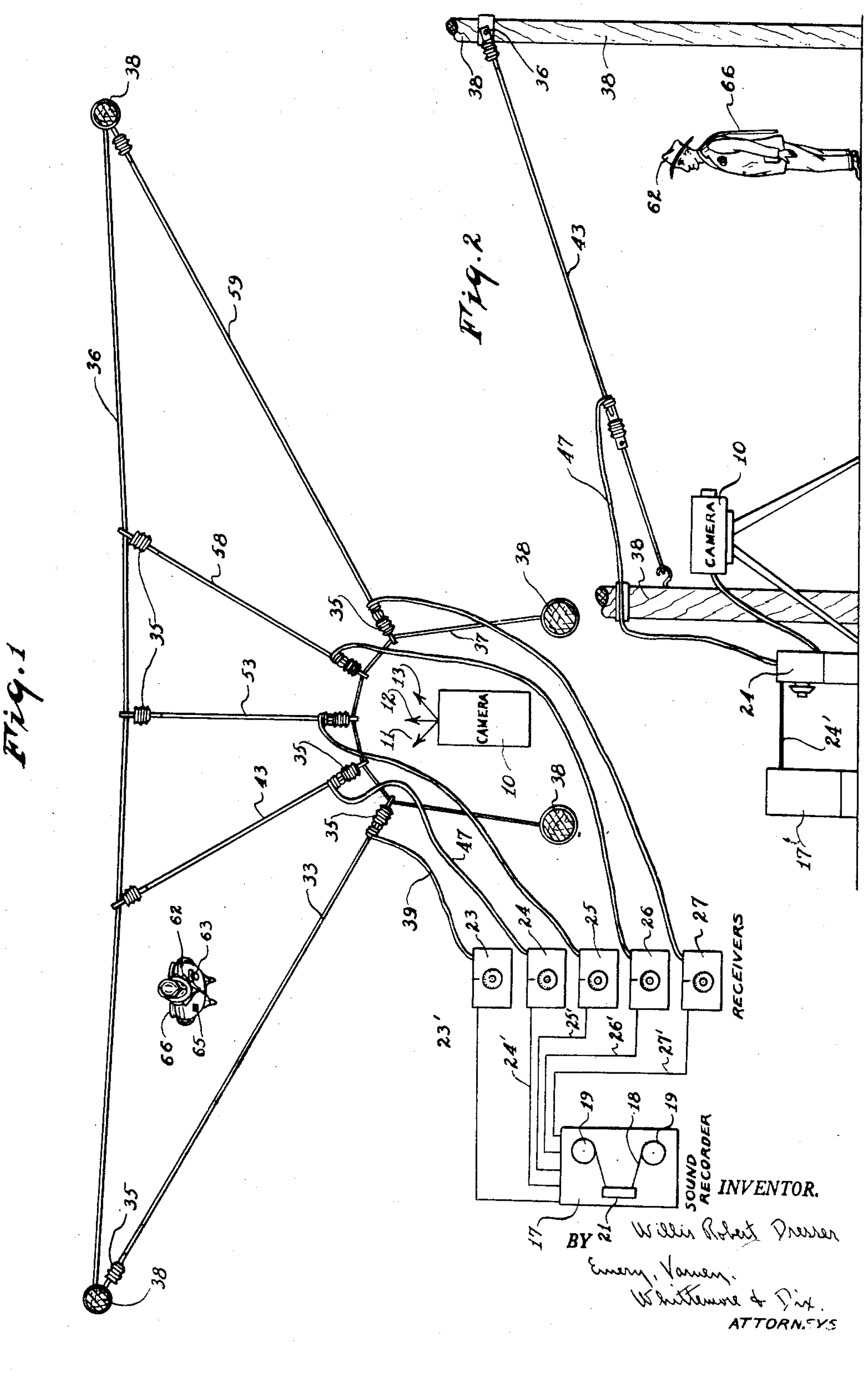

This invention relates to the recording of sound when making motion pictures. It is particularly concerned with the recording of sound to provide for the reproduction of stereophonic sound.

For the showing of motion pictures having stereophonic sound, it is necessary to have a plurality of individual sound tracks and to have each sound track control a loud speaker located behind a different portion of the screen, and sometimes at different parts of the theater, such as a speaker located at the sides of, or behind the audience. When making the individual sound tracks, the sound recorded on each particular track must be the sound which comes from the direction corresponding to the location of the loud speaker which that sound track will control. When making motion pictures on large sets, or when making them out-of-doors, the correct recording of the sounds from the different parts of the set on different sound tracks presents difficulties.

It is an object of this invention to provide improved apparatus for recording sound which is to accompany motion pictures, and more particularly to provide improved apparatus for recording of sound for stereophonic reproduction, especially where the actors in a scene are located at a substantial distance from the camera. Another object of the invention is to provide improved apparatus for reducing the amount of sound recorded on one track while progressively increasing the amount of the same sound which is recorded on an adjacent track when the source of the sound is moving transversely across the scene in front of a camera. Another feature of the invention relates to the increasing of the volume of the sound as the source of sound moves closer to the camera.

The invention utilizes the wireless transmission of audio-modulated energy from a source to receiving and recording apparatus by which the record of the sound is made. In the preferred embodiment of the invention there are aerials located over the scene which is being photographed; there being a different aerial for each of the sound tracks which are recorded, and signals corresponding to the sound to be recorded are transmitted by wireless from the source of sound to the nearest aerial and to more than one aerial when the source of sound is located between them or is of such magnitude that it will operate more than one recording apparatus at a time. The aerials extend angularly in the directions corresponding to the angular directions from which the sound will come from the speakers in a theater where the sound is reproduced stereophonically.

The aerials extend from the camera radially and preferably at an elevation which increases progressively away from the camera so as to avoid having any of the aerials in the camera field. This sloping disposition of the aerials has the added advantage that as a source of sound moves closer to the camera, the distance from the transmitting aerial to the receiving aerial becomes progressively less, and the strength of the signal in the recorder increases with resulting increase in amplitude of the recorded sound. This is advantageous because the approach of the source of sound toward the camera should make the sound become louder.

Other objects, features and advantages of the invention will appear or be pointed out as the description proceeds.

In the drawing, forming a part hereof, in which like reference characters indicate corresponding parts in all the views;

Figure 1 is a diagrammatic top plan view showing a motion picture camera and aerials located over the field being photographed, with each of the aerials connected to a different recorder for making one of the sound records for stereophonic sound which is to accompany the picture made by the camera; and Figure 2 is an elevation of the camera and one of the aerials shown in Figure 1, with an actor under one of the aerials.

A motion picture camera 10 is located in position to photograph a wide field ahead of it. Stereophonic sound is most effective with wide angle pictures, and the camera 10 is shown as a camera for making three different images of adjacent portions of the field for subsequent projection as a mosaic picture. The camera 10 has three lenses and the optical axes of the different lenses are represented by the arrows 11, 12 and 13. The lens having its axes extending in the direction of the arrow 11 photographs the left-hand portion of the field; the middle lens having its axes along the direction of the arrow 12, photographs the center of the field; and the other lens with its axes extending in the direction of the arrow 13, photographs the right-hand portion of the field.

Such cameras are designed so that the picture taken by each lens overlaps the picture taken by the lens next to it; and when the pictures are projected, the overlapping edges are vignetted so that the adjacent pictures merge into one another with no change in illumination of the screen along the match line. Such cameras are well known in the art, and no further description of the camera is necessary for a complete understanding of this invention.

A sound recorder 17 operates with a film 18 which is wound on spools 19 and which is fed through a sound head 21 by mechanism which advances the film at a uniform speed. The sound head 21 contains as many recorders as desired, depending upon the number of sound tracks which are to be made on the film 18.

In the apparatus illustrated, there are to be five parallel sound tracks along the film 18, and in order to supply signals to the recorders in the sound head 21, there are five separate radio receivers 23, 24, 25, 26 and 27. Each of these radio receivers is connected with a different one of the sound recorders in the sound head 21 by conductors which are indicated by the same reference characters as the radio receivers which they are connected to, but with a prime appended to the reference character of the conductor.

The radio receiver 23 is connected with an aerial 33. This aerial 33 is supported at opposite ends by insulators 35 suspended from wires 36 and 37 which are connected to supporting posts 38 outside of the field of the camera. The aerial 33 extends in a radial direction from the camera 10 and across the top of the left hand portion of the field which is photographed by the camera lens facing in the direction of the arrow 11. The aerial 33 extends upwardly as it runs away from the camera so as to maintain every part of the aerial at a level higher than the field photographed by the camera.

The aerial 33 is connected with the radio receiver 23 by a conductor 39 and whenever a radio signal, for which the receiver 23 is tuned, is received by the aerial 33, the radio receiver 23 will transmit pulses, representing audio modulations of the signal, through the conductor 23' to the sound recorder with which the receiver 23 is connected.

Another aerial 43 is located in front of the camera 10 and extends in a substantially radial direction from the camera. The aerial 43 is supported at its opposite ends by insulators 35 suspended from the wires 36 and 37. This aerial 43, like the aerial 33, is located above the field photographed by the camera, and extends upwardly in a direction away from the camera so as to always be above the camera field. The aerial 43 is connected with the radio receiver 24 so that signals received by this aerial 43 are transmitted through a conductor 47 to the radio receiver 24, and those signals which have the frequency to which the radio receiver 24 is tuned, produce audio-modulated pulses which are transmitted through the conductor 24', to operate the sound recorder, in the sound head 21, which corresponds to the aerial 43.

In the arrangement illustrated, aerial 43 is located in a position over the right-hand portion of the field photographed by the lens facing in the direction of the arrow 11, and this aerial 43 is not far from the left-hand end of the field which is photographed by the middle lens of the camera 10.

Another aerial 53 is located directly in front of the camera 10 and is supported from insulators 35 and on a slope, in the same way as the aerials 33 and 43. This aerial 53 is located in the middle of the field which is photographed by the middle lens of the camera 10. There are other aerials 58 and 59 located over the field which is photographed by the camera lens facing in the direction of the arrow 13; and these aerials 58 and 59 are similar to the aerials 43 and 33, respectively, but on the other side of the camera field.

A source of sound, such as an actor 62, carries a microphone 63 connected to a radio transmitter 65 which has an aerial 66. When the actor 62 is located in the position indicated in Figure 1, signals from the aerial 66 are transmitted to the aerials 33 and 43, and the sounds which modulate these signals are recorded on the sound tracks controlled by both of the aerials 33 and 43.

As the actor 62 moves toward the right, in Figure 1, and approaches a position directly under the aerial 43, the signals from the transmitter aerial 66 are received in somewhat greater strength by the aerial 43, and the signals picked up by the aerial 33 become progressively weaker.

As the actor 62 continues to move toward the right and away from his position directly under the aerial 43, the signals received by the aerial 43 become progressively weaker, and the signals picked up by the aerial 53 become progressively stronger. In order to obtain sound signals of substantially uniform volume, while the actor, or any other source of sound, moves across the camera field without getting either further from or closer to the camera, it is necessary that the radio receivers connected with successive aerials, such as the aerials 43 and 53, be adjusted so that the sum of the amplitudes of the signals recorded by the radio receivers which these aerials control, remains substantially constant.

This means that when the actor 62 is close to the camera, and in a position where the successive aerials are not so widely spaced from one another, any signal from the transmitting aerial 66 will always be recorded by more than one of the sound tracks, but predominantly on the sound track controlled by the receiving aerial which is closest to the transmitting aerial 66. This concentrates the reproduced sound in the corresponding speaker when the picture is projected, and produces stereophonic sound.

Figure 2 shows the actor 62 with the aerial 66 located on his back, and with a lapel microphone 63 in a position on his chest, in much the same position as the microphones which are used for persons hard-of-hearing. The radio transmitter 65 is located in the actor's pocket or attached to his belt, or otherwise supported from his person in an inconspicuous location. In actual use, the aerial 66 is located under the actor's clothes, and the microphone 63 may be also, so that both are invisible to the camera, no matter in what position the actor may be standing. When the costume worn by the actor is one which makes it difficult to conceal this radio equipment, the equipment may be located in a hat, or in some object carried by the actor, and when neither of these is possible the equipment must be located in some other object on the set which can be shifted from one location to another as necessary to record the speech of the actor 62. It will be understood that the actor 62 is merely representative of a source of sound which moves from one location to another in the field being photographed by the camera.

The camera 10 is connected with the sound recorder 17 by electrical connections which operate the camera film feed mechanism and the sound film feed mechanism in the recorder 17 in timed relation with one another. In the combination illustrated, a single film is used for all of the sound tracks; but the sound tracks or some of them, can be on separate film strips, if desired. Apparatus for obtaining such a relation between the sound and photographic films is well understood in the motion picture art, and no further description of it is necessary for a complete understanding of this invention.

The preferred embodiment of the invention has been illustrated and described, but changes and modifications can be made, and some features can be used in different combinations without departing from the invention as defined in the claims.

I claim as my invention:

1. Apparatus for recording stereophonic sound for accompanying a motion picture, the apparatus including a recorder having mechanism for feeding a sound film, a plurality of recording heads for making separate sound tracks on the film, a separate radio receiver for operating each of the recording heads, a plurality of aerials each of which is elongated in one direction and extends for a substantial distance lengthwise at an elevation above the field to be photographed, each of the aerials being connected with one of the radio receivers, the receivers being tuned to receive signals from the sending station, a camera in position to photograph a region located under the aerials, and a radio transmitter tuned to send signals to all of the receivers simultaneously, the transmitter having an aerial carried by a movable sound source that operates below the level of the aerials and in the region to be photographed by the camera.

2. The apparatus for recording stereophonic sound described in claim 1, and in which all of the aerials extend in directions away from the camera.

3. The apparatus described in claim 2 and in which the aerials diverge from one another as they extend away from the camera and with all of the aerials located within a sector that corresponds approximately to the field embraced by the camera lens and with the aerials angularly spaced from one another about a center located near the center of divergence of the camera field.

4. The apparatus described in claim 2 and in which the aerials are located above the camera field and in which they extend upwardly at an acute angle to the horizontal as they extend away from the camera.

5. The apparatus described in claim 2 and in which the aerials diverge from one another as they extend away from the camera and with all of the aerials located within a sector that corresponds approximately to the field embraced by the camera lens and with the aerials angularly spaced from one another about a center located near the center of divergence of the camera field, each of the aerials being located above the field of the camera and sloping upwardly to a higher elevation as it extends away from the camera.

6. Apparatus for recording stereophonic sound for motion pictures, including a recorder having a plurality of recording heads, a separate radio receiver connected with each of the recording heads, a motion picture camera, connections between the recorder and the camera for synchronizing the operation of the recorder and the camera, and a plurality of aerials located at different places in the camera field and extending outwardly from the camera and diverging from one another as they extend outwardly and along lines corresponding with the divergence of the camera field, the different aerials being connected with different radio receivers.

7. Apparatus for recording stereophonic sound for use with mosaic motion pictures, said apparatus comprising recorder means having a plurality of recorder heads, a separate radio receiver connected with each of the recording heads, a camera having a plurality of lenses located in position to photograph adjacent portions of a wide field on separate films which are projected to make a mosaic image, connections between the recorder means and the camera for synchronizing the operation of the recording heads with the camera, a separate aerial connected with each of the radio receivers, the aerials extending outwardly from the camera and diverging from one another as they extend outwardly and along lines corresponding with the divergence of the camera field, the aerials being spaced angularly across the camera field and being distributed among the different portions of the total field which are photographed by the different lenses of the camera.

8. The apparatus described in claim 7 and in which the aerials are located above the camera field and positioned at acute angles to the horizontal with the elevation of the aerials increasing in a direction away from the camera.

9. In stereophonic sound recording apparatus wherein separate tracks are recorded on a sound film by recorders operated by sound signals from separate receivers tuned to signals from a sound source and the signals are transmitted to the receivers by a radiant energy transmitter that travels with the sound source within a photographic field of a motion picture camera while the camera is photographing the motion of the sound source in the camera field, including movement of the sound source toward and from the camera, and there are means for moving the sound film for each of the recorders in timed relation with a photographic film of the camera, the improvement which comprises a plurality of aerials at spaced locations transversely across the camera field, and a different one of which is connected with each of the receivers, the aerials extending lengthwise of the field in directions away from the camera for preventing proportional decrease in the radiant transmission distance as the source of sound and its transmitter move lengthwise of the field away from the camera.

10. Apparatus for recording sound to accompany motion pictures including a recorder having mechanism for feeding a sound film, a recording head within the recorder for making a sound track on the film, a radio receiver for operating the recording head, a motion picture camera having mechanism for feeding film, synchronizing connections between the film feeding mechanism of the recorder and camera, and an aerial for the radio receiver located above and extending across the camera field, said aerial extending in a direction away from the motion picture camera and increasing in elevation as it extends away from the camera.

11. Apparatus for recording sound to accompany motion pictures including a recorder having mechanism for feeding a sound film, a recording head within the recorder for making a sound track on the film, a radio receiver for operating the recording head, a motion picture camera having mechanism for feeding film, synchronizing connections between the film feeding mechanism of the recorder and camera, and an aerial for the radio receiver located above and extending across the camera field, said aerial extending in a direction away from the camera and at an acute angle to the horizontal so that the height of the aerial increases as it extends away from the camera, and a radio transmitter having an aerial carried by a sound source that moves within the camera field and that carries the transmitter aerial in different directions across the field, but always at the same elevation, whereby the signals received by the sloping aerial become stronger as the movable sound source approaches closer to the camera and reduces the distance between the transmitting and receiving aerials.

References Cited in the file of this patent

UNITED STATES PATENTS

| | | |
|---|---|---|
| 1,219,682 | Vansize | Mar. 20, 1917 |
| 2,060,204 | Hammond | Nov. 10, 1936 |
| 2,343,471 | Nixon | Mar. 7, 1944 |
| 2,636,943 | Schaeffer | Apr. 28, 1953 |
| 2,685,224 | Mueller | Aug. 3, 1954 |